US012796791B2

(12) United States Patent
Browne

(10) Patent No.: US 12,796,791 B2
(45) Date of Patent: Nov. 17, 2026

(54) UMBRELLA WITH LED RIB STRUCTURE AND RELATED METHODS

(71) Applicant: AtLeisure, LLC, Atlanta, GA (US)

(72) Inventor: William Martin Browne, Atlanta, GA (US)

(73) Assignee: ATLeisure, LLC, Atlanta, GA (US)

( * ) Notice: Subject to any disclaimer, the term of this patent is extended or adjusted under 35 U.S.C. 154(b) by 0 days.

(21) Appl. No.: 19/118,846

(22) PCT Filed: Jan. 5, 2024

(86) PCT No.: PCT/US2024/010405
§ 371 (c)(1),
(2) Date: Apr. 7, 2025

(87) PCT Pub. No.: WO2024/148215
PCT Pub. Date: Jul. 11, 2024

(65) Prior Publication Data

US 2026/0101978 A1 Apr. 16, 2026

Related U.S. Application Data

(60) Provisional application No. 63/478,597, filed on Jan. 5, 2023.

(51) Int. Cl.

| | |
|---|---|
| ***A45B 25/02*** | (2006.01) |
| ***A45B 23/00*** | (2006.01) |
| ***F21S 4/28*** | (2016.01) |

(52) U.S. Cl.
CPC .............. *A45B 25/02* (2013.01); *A45B 23/00* (2013.01); *F21S 4/28* (2016.01); *A45B 2023/0012* (2013.01); *A45B 2200/1018* (2013.01); *A45B 2200/1027* (2013.01)

(58) Field of Classification Search
CPC .............................................. A45B 2200/1018
See application file for complete search history.

(56) References Cited

U.S. PATENT DOCUMENTS

| | | | | |
|---|---|---|---|---|
| 5,836,328 | A | 11/1998 | Lee | |
| 7,000,624 | B2 | 2/2006 | Chang | |
| 7,533,679 | B2 | 5/2009 | Harbaugh | |
| 9,408,444 | B2 | 8/2016 | Jin | |
| 11,098,861 | B1 * | 8/2021 | Wang | A45B 23/00 |

(Continued)

FOREIGN PATENT DOCUMENTS

| | | |
|---|---|---|
| CN | 209594935 | 11/2019 |
| CN | 217309379 | 8/2022 |

(Continued)

*Primary Examiner* — Alexander K Garlen
(74) *Attorney, Agent, or Firm* — Allen, Dyer, Doppelt + Gilchrist, PA

(57) ABSTRACT

An umbrella includes a support extending upwardly, and an umbrella canopy assembly coupled to the support. The umbrella canopy assembly includes a tray, first ribs extending from the tray, and a canopy carried by the first ribs. Each first rib includes a body, a light transparent body aligned with the body, the body and the light transparent body defining a coupling interface, and a light source carried by the coupling interface and configured to transit visible radiation through the light transparent body and under the canopy.

20 Claims, 15 Drawing Sheets

(56) References Cited

U.S. PATENT DOCUMENTS

2005/0013130 A1* 1/2005 Li .......................... A45B 23/00 362/102
2005/0121063 A1* 6/2005 Chang ...................... A45B 3/04 135/910
2007/0074750 A1* 4/2007 Harbaugh ................ A45B 3/04 135/91
2007/0127231 A1* 6/2007 Li ....................... H01M 50/244 362/102
2008/0068823 A1 3/2008 Lim
2008/0105287 A1* 5/2008 Huali ....................... A45B 3/04 135/16
2009/0196041 A1 8/2009 Joseph et al.
2011/0058377 A1* 3/2011 Chou ...................... F21V 29/74 362/294
2013/0128581 A1* 5/2013 Hsu ....................... F21V 21/002 362/249.02
2013/0201653 A1 8/2013 Shoemake et al.
2015/0216273 A1 8/2015 Akin
2015/0237976 A1* 8/2015 Chow ..................... F21V 23/02 135/16
2016/0183646 A1* 6/2016 Jin ........................... A45B 3/04 135/16
2018/0073719 A1* 3/2018 Bliss ......................... F21V 3/00
2019/0373991 A1* 12/2019 Wei .......................... A45B 3/02
2024/0041170 A1* 2/2024 Ke ......................... A45B 25/02
2024/0085013 A1* 3/2024 Luo ......................... F21V 23/06
2024/0180304 A1 6/2024 Browne
2024/0180305 A1 6/2024 Browne

FOREIGN PATENT DOCUMENTS

DE 202004012703 U1 * 11/2004 ............... A45B 3/04
FR 3114733 4/2022
FR 3114733 A1 * 4/2022 ............. A45B 19/00
KR 102305445 B1 * 9/2021 ................ F21V 1/22

* cited by examiner

UMBRELLA WITH LED RIB STRUCTURE AND RELATED METHODS

This application is based upon prior filed copending Application No. PCT/US2024/010405 filed Jan. 5, 2024, which is based upon Application No. 63/478,597 filed Jan. 5, 2023, the entire subject matter of these applications is incorporated herein by reference in its entirety.

TECHNICAL FIELD

The present disclosure relates to the field of umbrellas, and, more particularly, to an umbrella with lights and related methods.

BACKGROUND

Sun protection umbrellas are now used in various applications, for example, at the beach or swimming pool, within hotels, and within outdoor markets/cafes. Of course, the primary purpose of these umbrellas is to provide shade from the sun, but there is a desire to utilize these areas at night without closing the umbrella. In some approaches, umbrellas are outfitted with electronic lighting under the canopy to illuminate the adjacent areas at night.

For example, U.S. Pat. No. 7,533,679 to Harbaugh, which is assigned to the present application's assignee, discloses an umbrella comprising ribs formed for light emitting diode (LED) installation. A potential drawback to this approach is the cost of manufacture, which is due to a sophisticated fabrication process. Further, drilled umbrella ribs have poor wind resistance, thus resulting in shorter lifespan. Chinese Patent Document No. CN209594935U discloses an LED umbrella made from shaped metallic umbrella ribs. A potential drawback to this approach is difficult and costly assembly of the lighting unit.

SUMMARY

Generally, an umbrella comprises a support extending upwardly, and an umbrella canopy assembly coupled to the support. The umbrella canopy assembly includes at least one tray, a first plurality of ribs extending from the at least one tray, and a canopy carried by the first plurality of ribs. Each first rib may include a body comprising first and second body L-shaped arms, and a light transparent body aligned with the body. The light transparent body may include a medial portion being adjacent to the first and second body L-shaped arms, first and second longitudinal arms extending upwardly from the medial portion and defining a slot, and first and second light transparent L-shaped arms extending laterally from the medial portion and defining first and second grooves respectively receiving the first and second body L-shaped arms to define a tongue and groove coupling interface. The slot may be between the first and second grooves. Each first rib may also include a light source carried within the slot and configured to transit visible radiation through the light transparent body and under the canopy. The first and second body L-shaped arms, the first and second longitudinal arms, and the first and second light transparent L-shaped arms may be coplanar with respect to a transverse axis of each first rib.

In some embodiments, the light transparent body may include first and second longitudinal arms defining a slot, and first and second light transparent L-shaped arms defining first and second grooves respectively receiving the first and second body L-shaped arms to define a tongue and groove coupling interface, the slot being between the first and second grooves. Each first rib also includes a light source carried within the slot and configured to transit visible radiation through the light transparent body and under the canopy. The first and second body L-shaped arms, the first and second longitudinal arms, and the first and second light transparent L-shaped arms may be coplanar with respect to a transverse axis of each first rib. The slot may be between the first and second body L-shaped arms and the first and second light transparent L-shaped arms.

In some embodiments, the light transparent body may include first and second longitudinal arms defining a slot receiving the light source. The light source may include a strip of light emitting devices positioned within the slot. The coupling interface may include a tongue and groove interface. For example, the coupling interface may include first and second grooves, and first and second L-shaped arms received by the first and second grooves.

Also, each first rib may include first and second end covers respectively positioned on first and second ends of a respective rib. The umbrella canopy assembly may include a photovoltaic (PV) cell, and a battery coupled to the PV cell and the light sources of the first plurality of ribs. The PV cell may be carried by the at least one tray. Further, the at least one tray may include a first tray coupled to the first plurality of ribs, a second tray below the first tray, and a second plurality of ribs coupled between the second tray and the first plurality of ribs.

Another aspect is directed to a method of making an umbrella. The method includes forming a support to extend upwardly, and coupling an umbrella canopy assembly to the support. The umbrella canopy assembly includes at least one tray, a first plurality of ribs extending from the at least one tray, and a canopy carried by the first plurality of ribs. Each first rib includes a body, a light transparent body aligned with the body, the body and the light transparent body defining a coupling interface, and a light source carried by the coupling interface and configured to transit visible radiation through the light transparent body and under the canopy.

DETAILED DESCRIPTION

Figure 1:
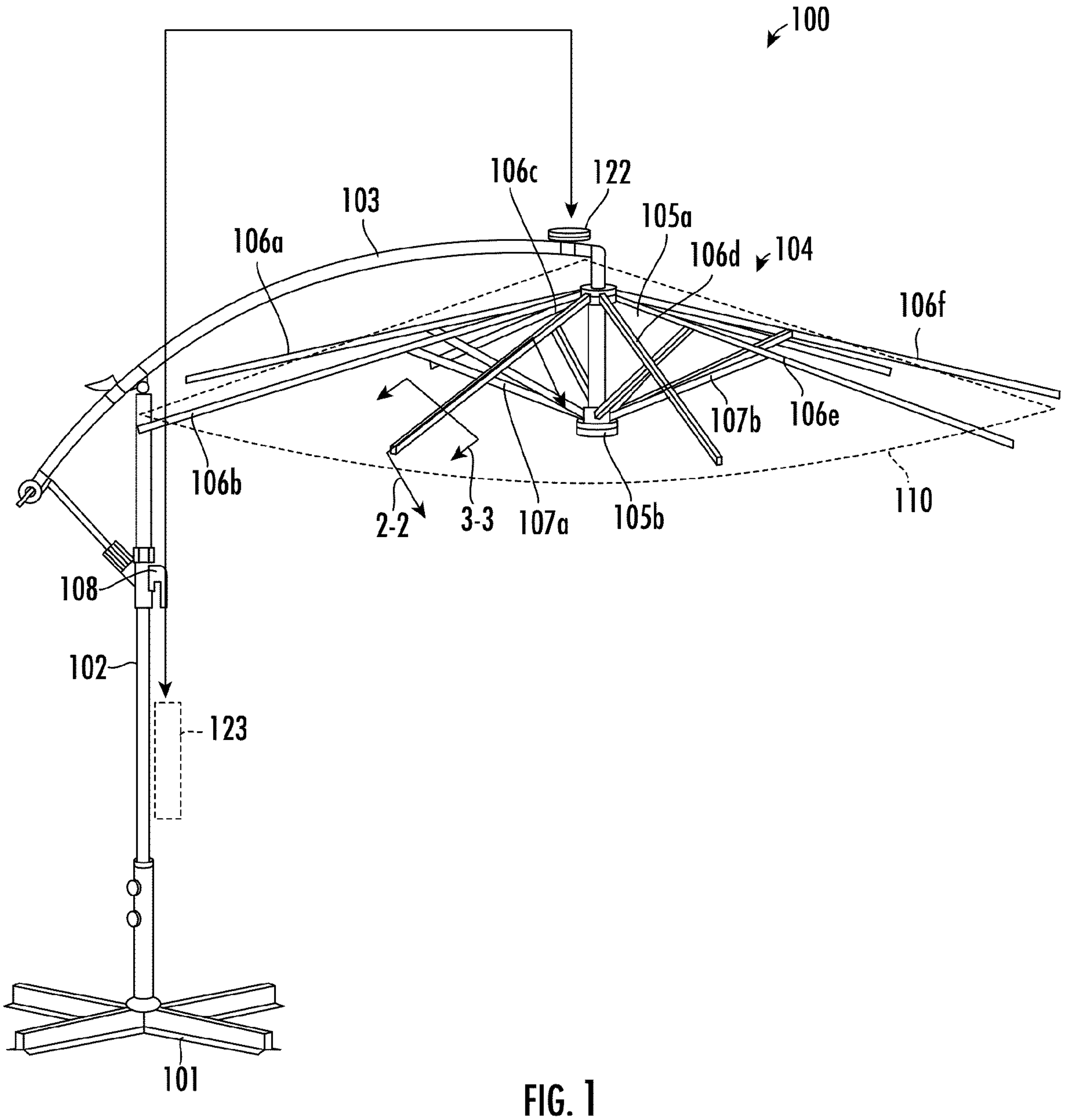
FIG. 1 is a perspective view of an umbrella, according to a first embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

In light of the drawbacks stated noted above, the present disclosure provides an approach that includes umbrella ribs and an LED umbrella to address existing technical problems, such as difficult umbrella rib fabrication, poor wind resistance of the finished product, difficult luminaire assembly, and high fabrication cost. Umbrella ribs comprise: a long and narrow body with the long side forming a joining section; a light transmitting panel with the side facing the body forming a mating section connected with the joining section, a hollow light trough is arranged inside the light transmitting panel, a light emitting element is mounted in the light trough, and the light trough is arranged with an opening for filling in the light emitting element at the side facing the body; and a rib sleeve covering the opening of the body for sealing the end of the body and hiding the light emitting element inside as an act of protection.

The joining section of the body forms an outward bending interlocking section with "L"-shaped section at one side and a mirroring interlocking section at the other side, between the interlocking sections forms a storage area for accommodating the light trough with the light transmitting panel. The light transmitting panel forms an inward bending "┐"-shaped interlocking trough at the side facing the body and a mirroring interlocking trough at the other side. The interlocking section and interlocking trough match each other, making the light transmitting panel slide and lay into the body.

The hollow light trough of the light transmitting panel is "herringbone", circular, "mouth-shaped" or open trough with an upper opening. The joining section of the body is an open trough, and the mating section of the light transmitting panel is designed to be exactly contained in the open trough. The mating section and open trough attach to each other by friction, bind together by adhesive, or magnetically couple each other, so as to ensure that the mating section is contained in the open trough while being used.

The joining section of the body is designed in major arc shape, and the mating section of the light transmitting panel is designed in concentric major arc shape consistent with the size. Thus, the mating section can be slid and laid into the joining section for fixation. The joining section of the body is designed in a major arc shape, and the light transmitting panel forms a flat section outside the mating section and connects to the body through magnetic force or binding between the flat section and the body on contact surface.

The joining section of the body forms an outward bending interlocking section. The interlocking section is designed in arc form featuring bilateral symmetry, and the light transmitting panel forms an inward bending arc-shaped interlocking trough at the side facing the body. The interlocking section and interlocking trough match each other in shape, making the light transmitting panel slide and lay into the body. The light emitting element is a string light or surface-mounted printed circuit board (PCB) light. An LED umbrella comprises the above umbrella rib structure.

The present disclosure may provide a simple and easy-to-fabricate umbrella rib structure for the LED umbrella. Using aluminum and metallic materials for fabrication and sparing the trouble of drilling the umbrella ribs for LED installation one by one, the present disclosure may provide easier fabrication and higher strength of umbrella ribs. The light emitting unit of the present disclosure may comprise either traditional string light structure or surface-mounted PCB light structure, and has reduced cost as compared to that of a typical PCB tube structure. Furthermore, the present disclosure provides for an open-slot light with the light emitting unit directly laid into the umbrella ribs via the open slot, thus resulting in far higher production efficiency than in existing approaches. The characteristics, structures or features described can be combined into one or more embodiments in any appropriate manner.

Figure 8:
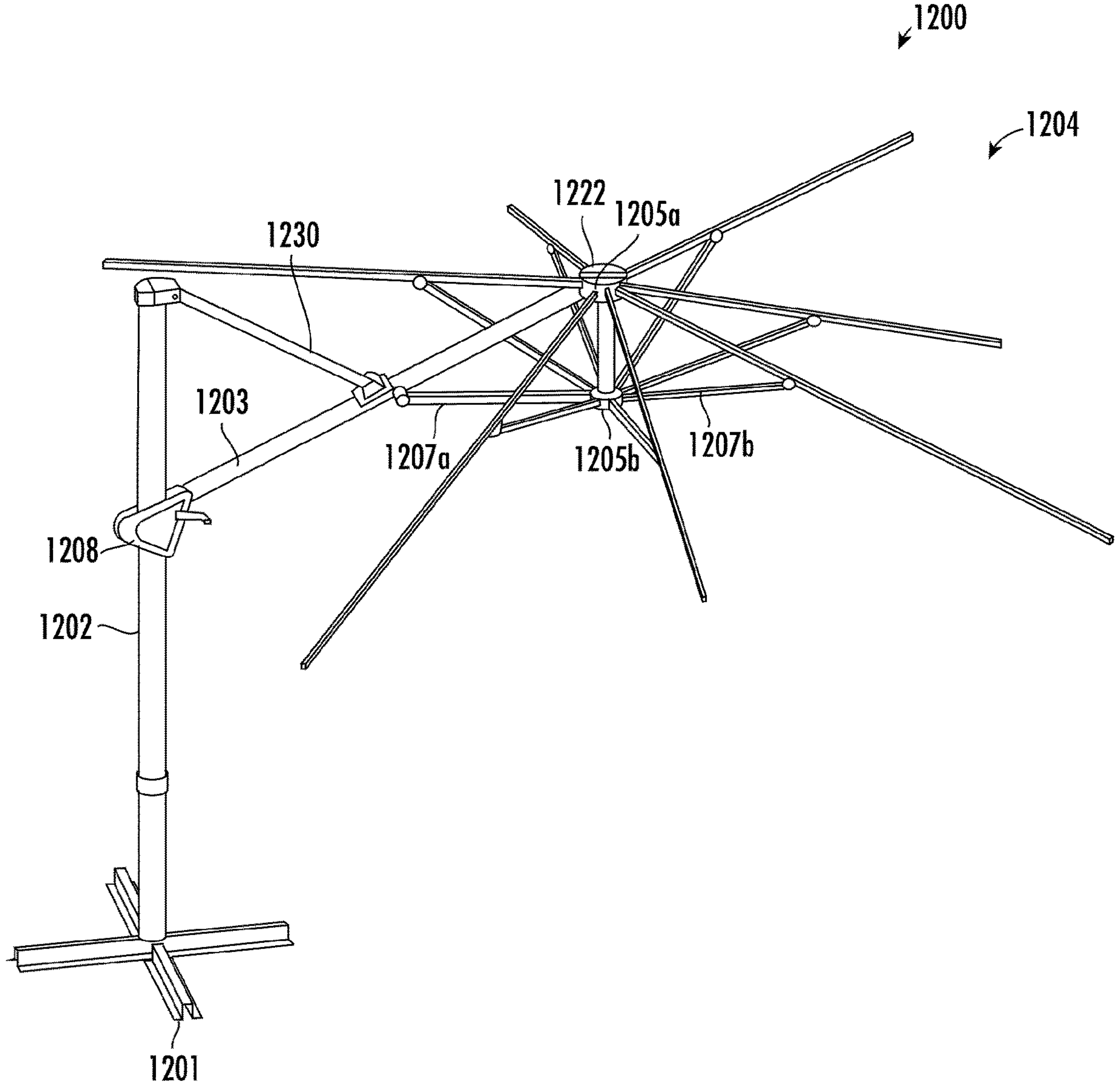
FIG. 8 is a perspective view of an umbrella, according to a second embodiment of the present disclosure.

Referring now to FIG. 8, an embodiment of the LED umbrella comprises a column and an umbrella stand. The column is arranged with an upper umbrella tray and a lower umbrella tray. Atop the umbrella stand is a solar PV cell. The umbrella stand comprises long umbrella ribs, short umbrella ribs, a diagonal rod, and a pull rod. The column is sleeved with a sliding sleeve handle. The diagonal rod connects with the sliding sleeve handle at one end and with the upper umbrella tray at the other end. The pull rod connects with the column at one end and directly with the umbrella stand at the other end, or indirectly with the umbrella stand via the diagonal rod.

Figure 9:
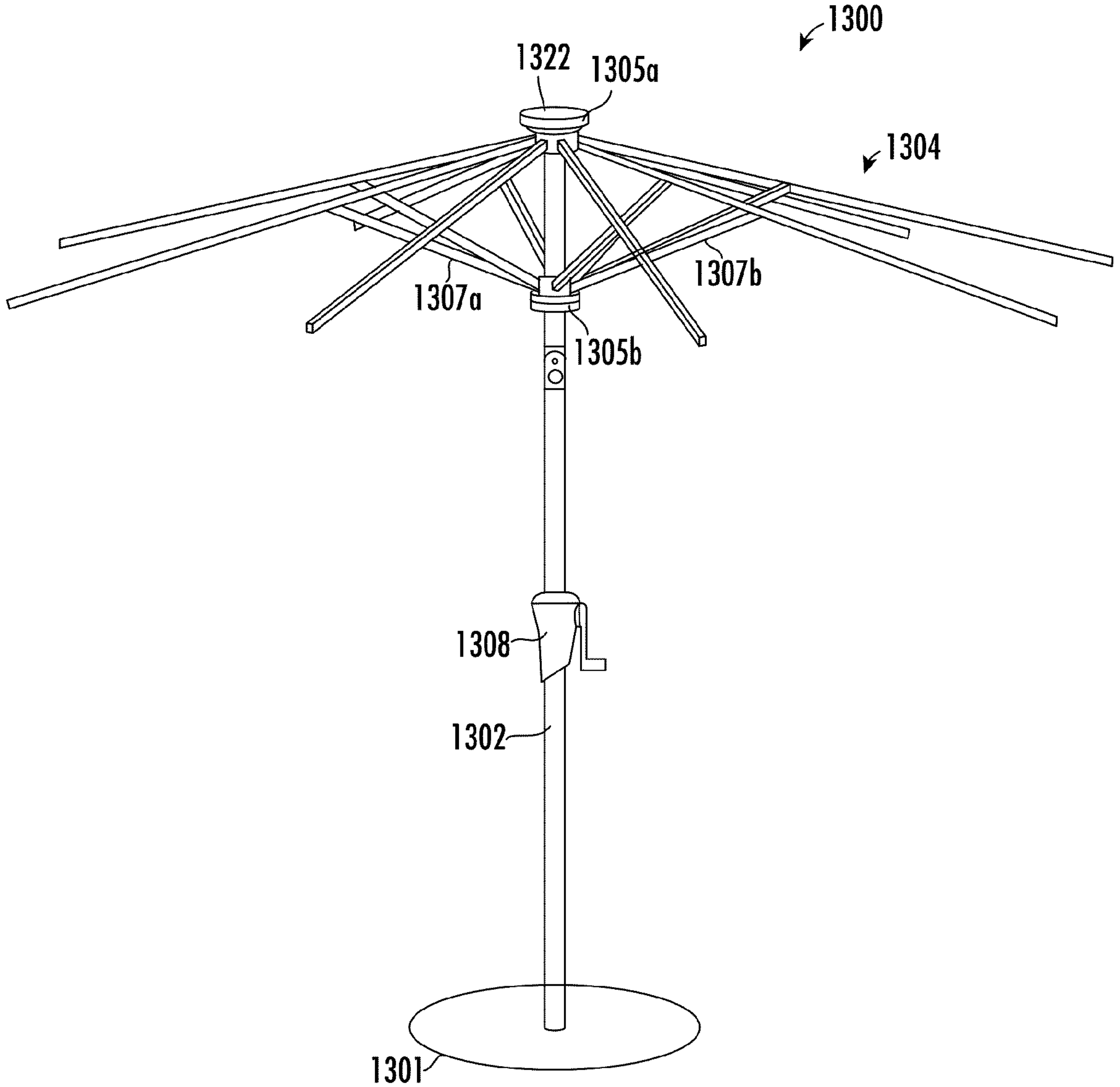
FIG. 9 is a perspective view of an umbrella, according to a third embodiment of the present disclosure.

FIG. 9 depicts another embodiment of the LED umbrella under middle column umbrella structure. Similar to the earlier embodiment, this embodiment also comprises a column and an umbrella stand connected. The umbrella stand comprises a long umbrella rib and short umbrella rib. The difference from the prior embodiment lies in that the column is arranged in the center of the umbrella stand.

FIG. 1 depicts another embodiment of the LED umbrella under sideways hanging umbrella structure. Similar to the prior embodiment, this embodiment also comprises a column and an umbrella stand connected. The umbrella stand comprises long umbrella ribs and short umbrella ribs. The difference from the prior embodiment lies in the method of connection between the diagonal rod and the umbrella stand. The three types of umbrellas are for illustration only. The LED umbrella may also apply to other types of sun protection umbrellas under umbrella rib structure.

Figure 2:
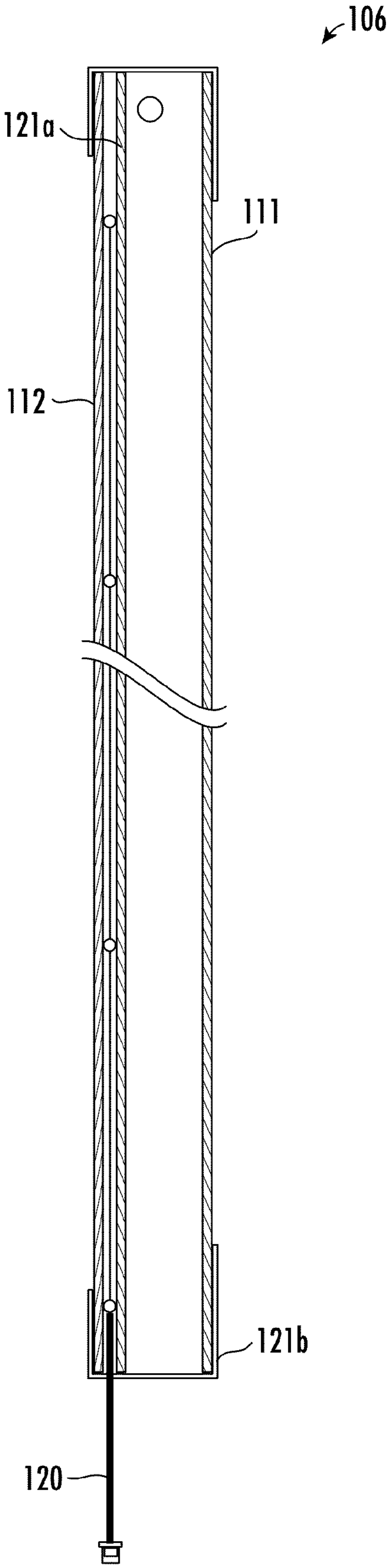
FIG. 2 is a sectional view of the umbrella rib from the umbrella of FIG. 1 along line 2-2.
Figure 3:
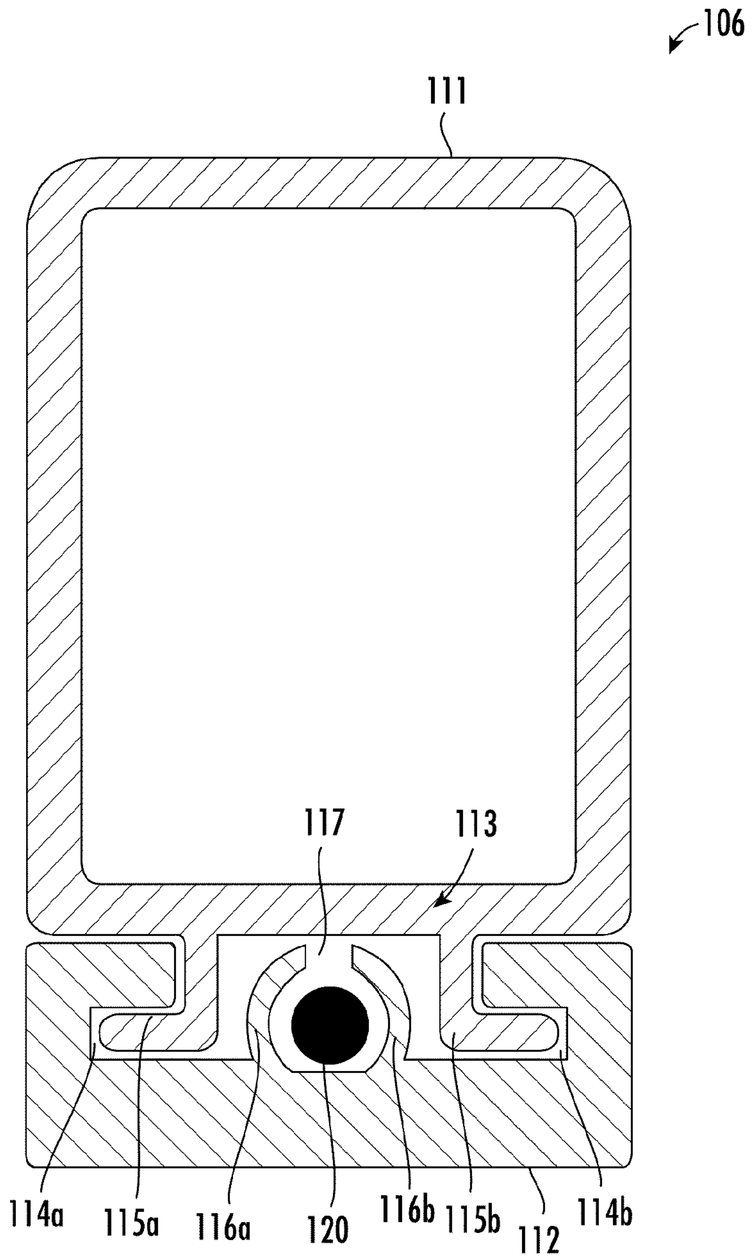
FIG. 3 is a sectional view of the umbrella rib from the umbrella of FIG. 1 along line 3-3.

Referring now additionally to FIGS. 2-3, the umbrella ribs of the above LED umbrellas are shown. The long umbrella ribs bear a similar internal structure to the short umbrella ribs. Thus, the long umbrella ribs are illustrated as follows, which applies to the short umbrella ribs in structure. The long umbrella ribs are long and narrow, and each comprises a body, a light transmitting panel, a light emitting element, and a rib sleeve. The body is hollow for carrying wiring and giving rigid support to the umbrella stand. The long side of the body is in detachable connection with the light transmitting panel, and the light transmitting panel and the body are preferably in a slidable and inlaid connection.

The light transmitting panel forms a hollow light trough at the side facing the body, and the light emitting element is mounted in the light trough. The other side of the light transmitting panel is designed for the transmission of light. The light trough is arranged with an opening at the side facing the body, via which the light emitting element (e.g., string light) can be easily passed into the light trough, instead of cutting through from the end. Alternatively, the light emitting element may be surface-mounted PCB light structure or spotlight arranged in the umbrella ribs. The rib sleeve sleeves the opening of the body for sealing the end of the body and hiding the light emitting element inside as an act of protection.

The body forms a tongue section (i.e., a tongue and groove interface) at the side facing the light transmitting panel. And accordingly, the light transmitting panel forms a groove section at the side facing the body. The tongue section and groove mating section are connected to form a connection between the light transmitting panel and the body, which is preferably a detachable mating connection. For instance, in the illustrated embodiment, the tongue section of the body forms an outward bending arm section with an "L"-shaped section at one side and a mirroring arm section at the other side. Between the arm sections forms a longitudinal recess for accommodating the light trough with the light transmitting panel. The light transmitting panel forms an inward bending "˥"-shaped groove at the side facing the body and a mirroring groove at the other side. The tongue section and the groove section match each other to make the light transmitting panel slid and laid into the body.

The solar cell may comprise a PV cell, and an integrated battery therein. In other embodiments, the battery may be housing separately, for example, in the column, and the battery may be electrically coupled to the PV cell. In some embodiments, the light emitting element may be automatically activated based upon detected ambient light from the solar cell (e.g., activating the light emitting element when ambient light falls below a threshold level).

Figure 5A:
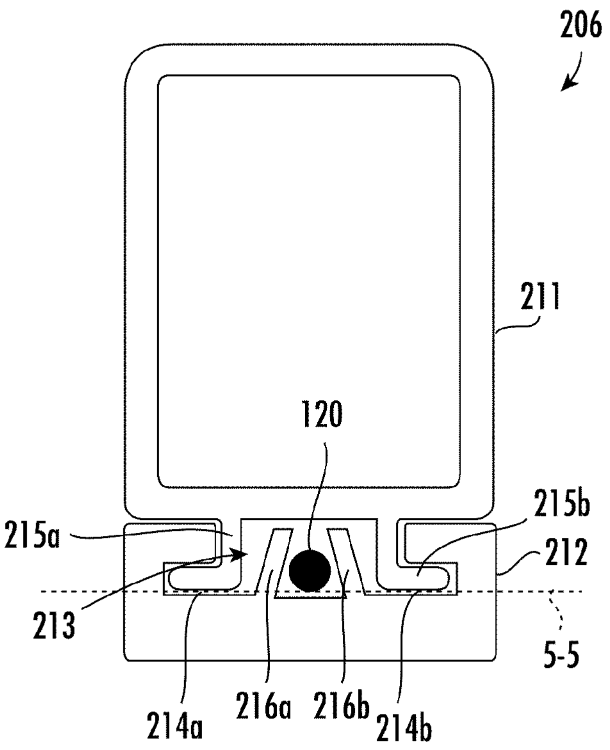
FIGS. 5A-5D are side views of different embodiments of the first rib from the umbrella of FIG. 1.
Figure 5B:
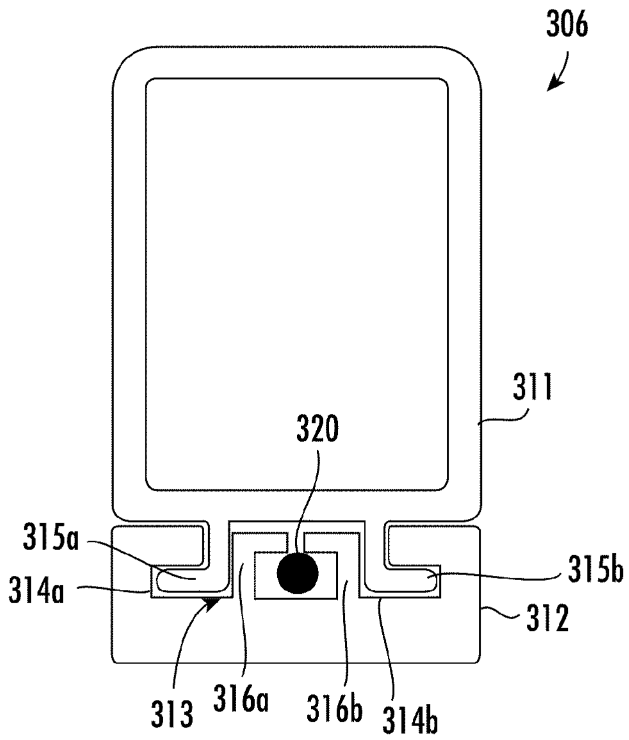
Figure 5C:
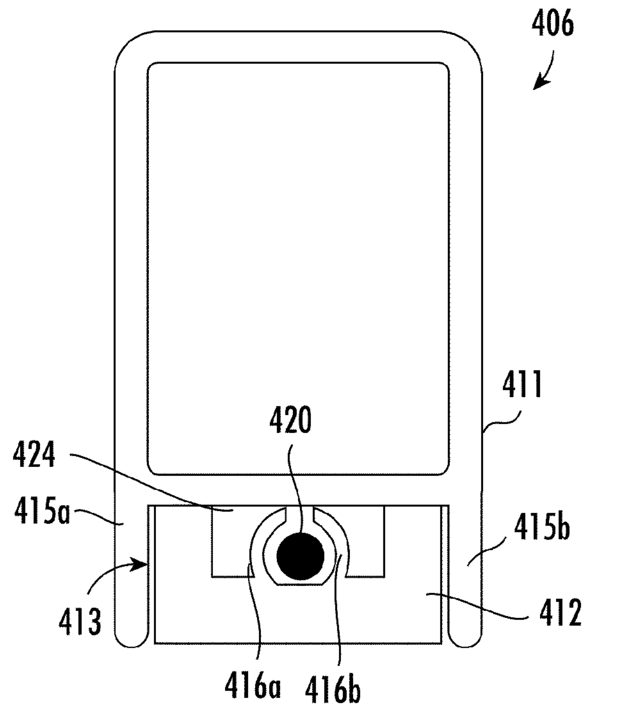

FIGS. 5A-5D & 6A-6E is a cross-section view of alternative embodiments of the umbrella ribs. The hollow light trough in the light transmitting panel can be in various shapes, herringbone, circular or mouth-shaped as shown in FIGS. 5A-5C, so as to accommodate the light emitting element and ensure mechanical strength.

Figure 5D:
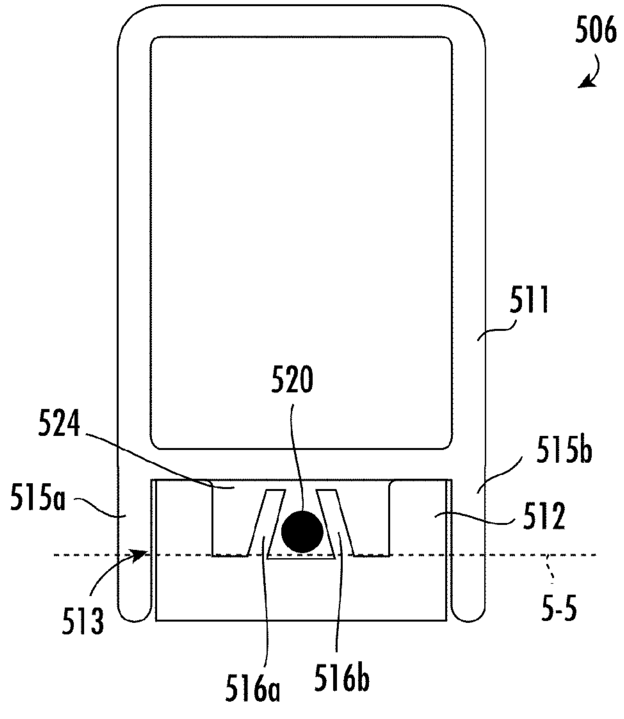

In another embodiment of the invention, as shown in FIGS. 5C-5D, the joining section of the body is an open trough, and the mating section of the light transmitting panel is designed to be exactly received in the open trough. The mating section and open trough attach to each other by friction, bind together by adhesive, or magnetically adsorb each other, so as to ensure that the mating section is contained in the open trough while being used.

In another embodiment of the invention, as shown in FIGS. 6A-6E, the joining section of the body is designed in a major arc shape. Accordingly, the mating section of the light transmitting panel is designed in a concentric major arc shape consistent with the size, thus the mating section can be slid and laid into the joining section for fixation.

Preferably, the light transmitting panel forms a flat section equal to or shorter than the short side of the body in length outside the mating section and connects to the body through magnetism or binding between the flat section and the body on the contact surface, realizing tighter and more secure connection between the body and the light transmitting panel. Under such circumstances, the mating section of the light transmitting panel may not necessarily be designed in a shape matching the joining section. Instead, the mating section may be designed into an open trough or any other shape with plenty of room for accommodating the light emitting element while retaining its own strength, as shown in FIG. 6C.

Figure 6A:
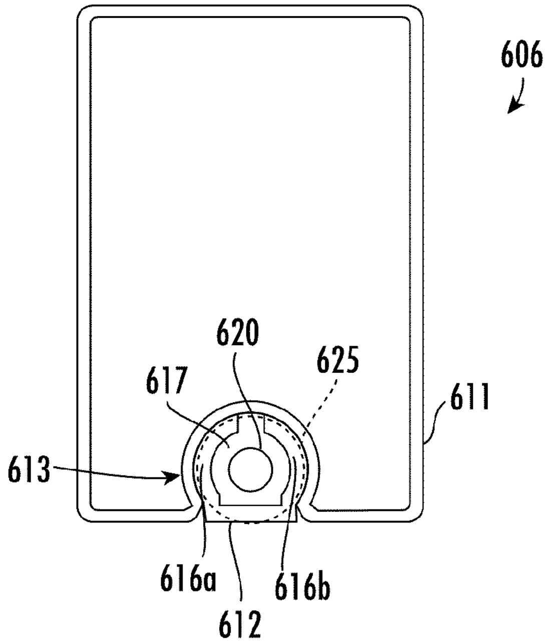
FIGS. 6A-6E are side views of additional different embodiments of the first rib from the umbrella of FIG. 1.
Figure 6B:
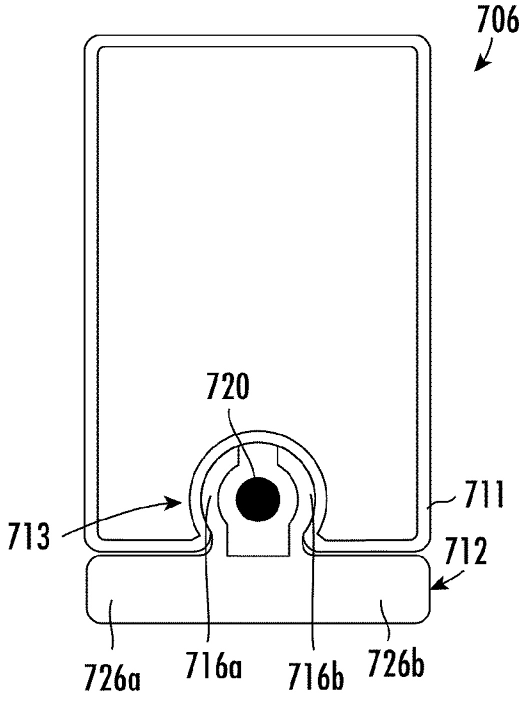
Figure 6C:
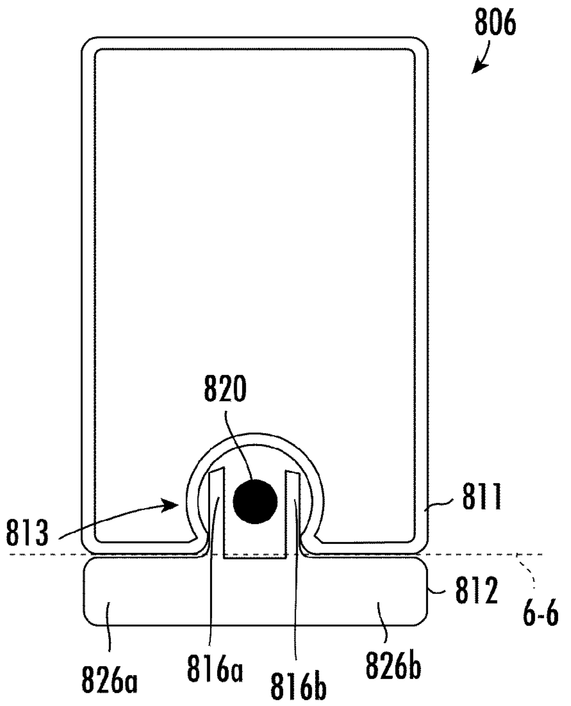
Figure 6D:
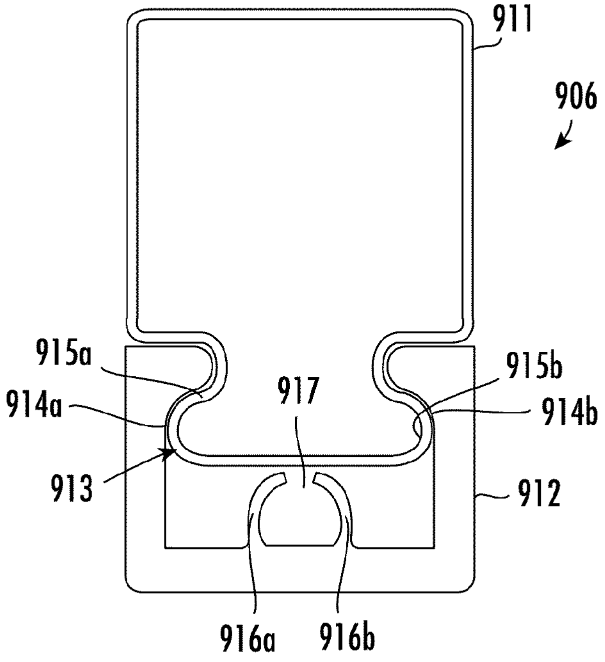
Figure 6E:
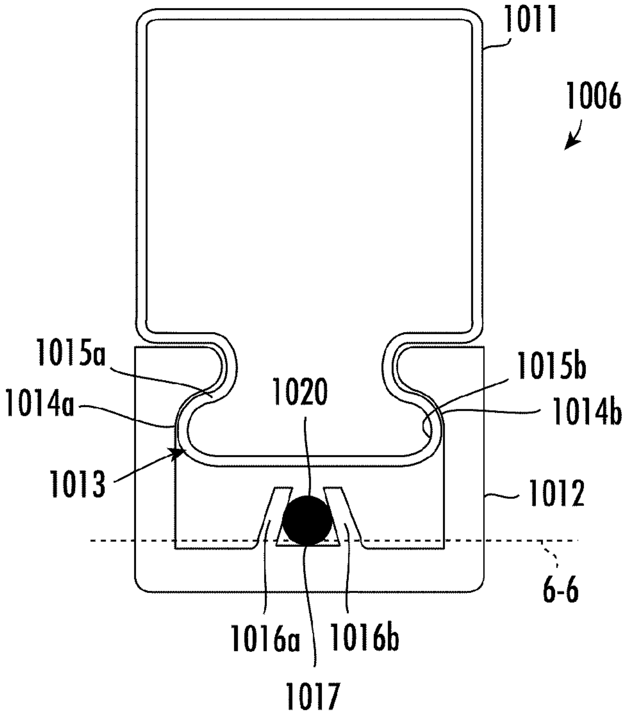

In another embodiment of the invention, as shown in FIGS. 6D-6E, the outward bending joining section of the body may be designed in an arc shape with bilateral symmetry, and between the interlocking sections may not be a recess. The light transmitting panel forms an inward bending arc-shaped trough at the side facing the body. The joining section and the trough match each other in shape, making the light transmitting panel slid and laid into the body. Given there is no recess, the light trough of the light transmitting panel may prop up the body atop. There are no limits on the shape of the light trough, arc, herringbone, or any other shapes.

FIGS. 4A-4B & 7A-7B depict varying embodiments of the umbrella ribs. For assembly of the umbrella ribs, the light emitting element is mounted into the light trough of the light transmitting panel via the opening. Then, the light transmitting panel is assembled with the body through sliding or any other methods of fixation. The open end of the body is sealed through the rib sleeve.

Umbrella ribs may comprise a long and narrow body with the long side forming a joining section; a light transmitting panel with the side facing the body forming a mating section connected with the joining section, a hollow light trough is arranged inside the light transmitting panel; a light emitting element is mounted in the light trough, and the light trough is arranged with an opening for filling in the light emitting element at the side facing the body; and a rib sleeve sleeving the opening of the body for sealing the end of the body and hiding the light emitting element inside as an act of protection.

In some embodiments, the umbrella ribs are characterized in that the joining section of the body forms an outward bending interlocking section with "L"-shaped section at one side and a mirroring interlocking section at the other side, between the interlocking sections forms a storage recess for accommodating the light trough with the light transmitting panel. The light transmitting panel forms an inward bending "˥"-shaped interlocking trough at the side facing the body and a mirroring interlocking trough at the other side. The interlocking section and interlocking trough match each other, making the light transmitting panel slide and lay into the body.

In some embodiments, the umbrella ribs are characterized in that the hollow light trough of the light transmitting panel is "herringbone", circular, "mouth-shaped" or open through with an upper opening. In some embodiments, the umbrella ribs are characterized in that the joining section of the body is an open trough, and the mating section of the light transmitting panel is designed to be exactly contained in the open trough.

In some embodiments, the umbrella ribs are characterized in that the mating section and open trough attach to each other by friction, bind together by adhesive, or magnetically attach each other, so as to ensure that the mating section is contained in the open trough while being used. In some embodiments, the umbrella ribs are characterized in that the joining section of the body is designed in major arc shape, the mating section of the light transmitting panel is designed in concentric major arc shape consistent with the size, and thus the mating section can be slid and laid into the joining section for fixation. In some embodiments, the umbrella ribs are characterized in that the joining section of the body is designed in major arc shape, the light transmitting panel forms a flat section outside the mating section and connects to the body through magnetism or binding between the flat section and the body on contact surface.

In some embodiments, the umbrella ribs are characterized in that the joining section of the body forms an outward bending interlocking section, the interlocking section is designed in arc shape featuring bilateral symmetry, the light transmitting panel forms an inward bending arc-shaped interlocking trough at the side facing the body, the interlocking section and interlocking trough match each other in shape, making the light transmitting panel slid and laid into the body. In some embodiments, the umbrella ribs are characterized in that the light emitting element is a string light, surface-mounted PCB light or spotlight.

An LED umbrella includes a long and narrow body with the long side forming a joining section; a light transmitting panel with the side facing the body forming a mating section connected with the joining section, a hollow light trough is arranged inside the light transmitting panel, a light emitting element is mounted in the light trough, and the light trough is arranged with an opening for filling in the light emitting element at the side facing the body; a rib sleeve sleeving the opening of the body for sealing the end of the body and hiding the light emitting element inside as an act of protection. An LED umbrella comprises the above umbrella rib structure. The umbrella ribs and LED umbrella disclosed in the patent are simple and easily fabricated, with far higher production efficiency than the background art.

Referring initially to FIGS. 1-3 & 4A-4B, an umbrella 100 according to the present disclosure is now described. As will be appreciated, the umbrella 100 illustratively comprises a cantilever/offset style umbrella. The umbrella 100 includes a base 101 resting on a floor surface, a support 102 extending vertically (i.e., substantially ±5° perpendicular to the floor surface) upwardly from the base, and an arm 103 extending laterally from the support 102, an umbrella canopy assembly 104 coupled to the support via the arm, and a sliding collar 108 sliding coupling the arm to the support.

The umbrella canopy assembly 104 illustratively includes a first tray 105*a*, a second tray 105*b* below and vertically aligned with the first tray, a first plurality of ribs 106*a*-106*f* extending from the first tray, and a second plurality of ribs 107*a*-107*b* coupled between the second tray and the first plurality of ribs. The umbrella canopy assembly 104 includes a canopy 110 (depicted with dashed lines for drawing clarity) carried by the first plurality of ribs 106*a*-106*f*. Each first rib 106*a*-106*f* includes a body 111, and a light transparent body 112 aligned with the body. The light transparent body 112 may comprise a material transparent or translucent (i.e., semi-transparent) to visible light radiation, for example, a clear polymer plastic.

As perhaps best seen in FIG. 3, the body 111 comprises a tube structure with a hollow interior. Further, the body 111 and the light transparent body 112 define a coupling interface 113. The coupling interface 113 includes a tongue and groove interface (i.e., an interlocking interface). In the illustrated example, the light transparent body 112 comprises first and second grooves 114*a*-114*b*, and the body 111 comprises matching first and second L-shaped arms 115*a*-115*b* received by the first and second grooves. The light transparent body 112 illustratively includes first and second longitudinal arms 116*a*-116*b* defining a light source receiving slot 117. Here, the first and second longitudinal arms 116*a*-116*b* are curved and substantially semi-circle shaped.

The umbrella canopy assembly 104 illustratively includes a light source 120 carried by the coupling interface 113 and configured to transit visible radiation through the light transparent body 112 and under the canopy 110. In particular, the light source 120 may include a strip of light emitting devices (e.g., LED devices) positioned within the light source receiving slot 117.

Also, each first rib 106*a*-106*f* illustratively comprises first and second end covers 121*a*-121*b* respectively positioned on first and second ends of a respective rib. As will be appreciated, the first and second end covers 121*a*-121*b* serve to seal the hollow interior of each first rib 106*a*-106*f*, thereby protecting the internal components from corrosion.

Figure 4A:
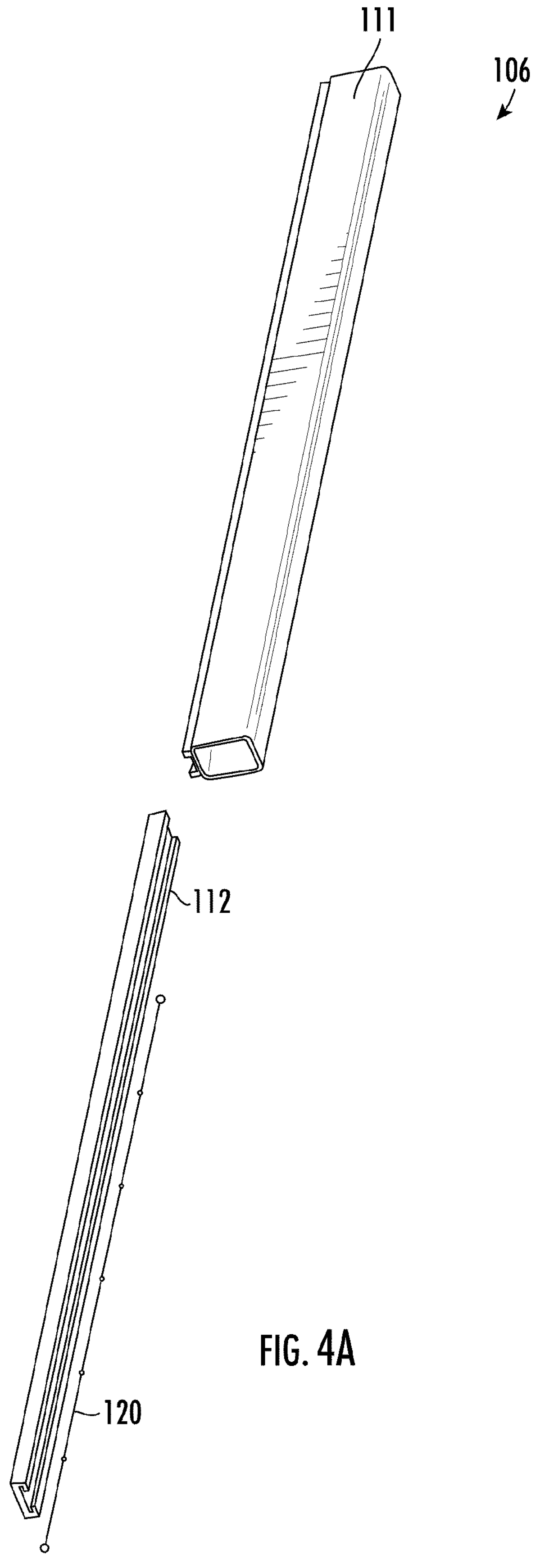
FIG. 4A is an exploded view of the first rib from the umbrella of FIG. 1.
Figure 4B:
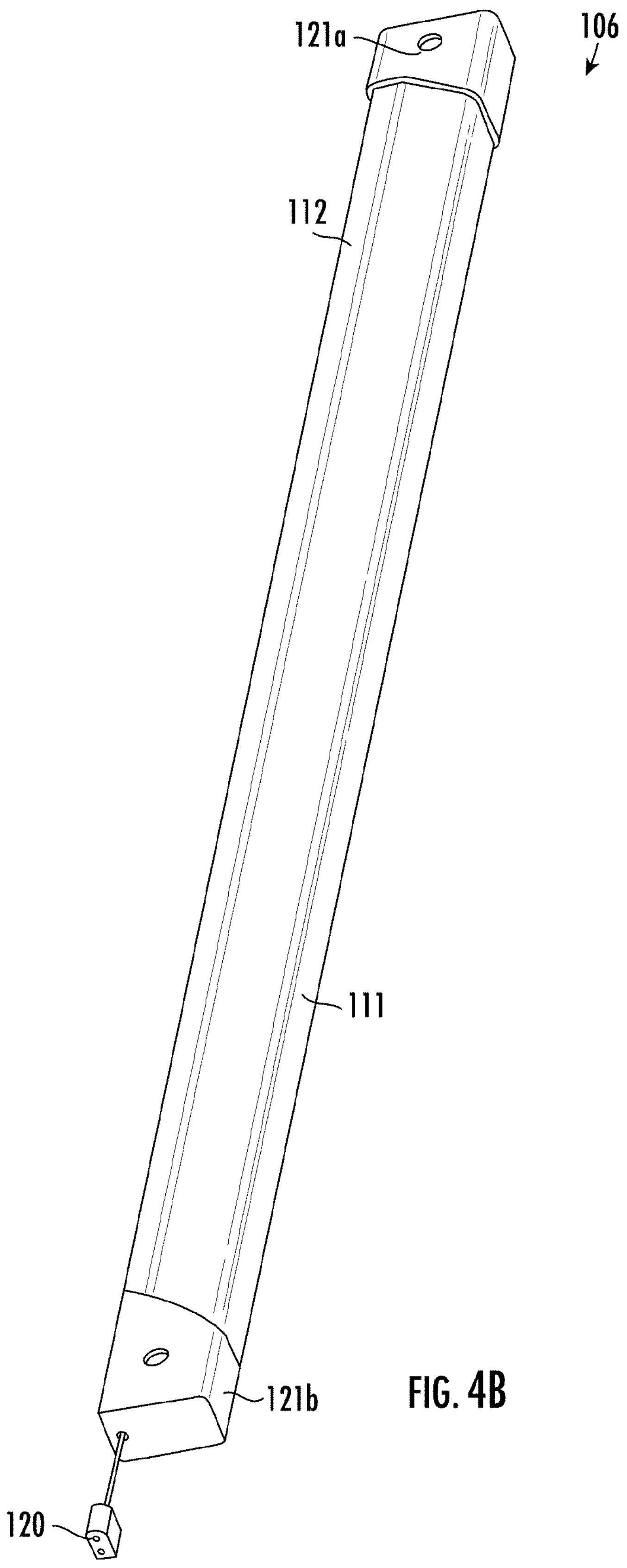
FIG. 4B is a perspective view of the first rib from the umbrella of FIG. 1.

As perhaps best seen in FIGS. 4A-4B, each first rib 106*a*-106*f* is assembled with a reduced number of steps. In particular, the light source 120 is inserted within the light source receiving slot 117, and the light transparent body 112 is inserted into the body 111 by sliding the first and second grooves 114*a*-114*b* over the first and second L-shaped arms 115*a*-115*b*. The method for assembly further includes positioning the first and second end covers 121*a*-121*b* respectively on first and second ends of a respective rib.

The umbrella canopy assembly 104 illustratively includes a PV cell 122, and a battery 123 coupled to the PV cell and the light sources of the first plurality of ribs 106*a*-106*f*. The PV cell 122 is illustratively carried by the first tray 105*a*, and the battery 123 (noted with dashed lines) is carried within the support 102. In some embodiments, the battery 123 may be integrated with the PV cell 122.

Another aspect is directed to a method of making an umbrella 100. The method includes forming a support 102 to extend upwardly, and coupling an umbrella canopy assembly 104 to the support. The umbrella canopy assembly 104 illustratively includes first and second trays 105*a*-105*b*, a first plurality of ribs 106*a*-106*f* extending from the first tray, and a canopy 110 carried by the first plurality of ribs. Each first rib 106*a*-106*f* includes a body 111, a light transparent body 112 aligned with the body, the body and the light transparent body defining a coupling interface 113, and a light source 120 carried by the coupling interface and configured to transit visible radiation through the light transparent body and under the canopy.

Referring now additionally to FIG. 5A, another embodiment of the first rib 206 is now described. In this embodiment of the first rib 206, those elements already discussed above with respect to FIGS. 1-3 & 4A-4B are incremented by 100 and most require no further discussion herein. This embodiment differs from the previous embodiment in that this first rib 206 illustratively includes first and second longitudinal arms 216*a*-216*b* that are straight and canted with respect to an axis 5-5. Here, the light source receiving slot 217 is trapezoid-shaped.

Referring now additionally to FIG. 5B, another embodiment of the first rib 306 is now described. In this embodiment of the first rib 306, those elements already discussed above with respect to FIGS. 1-3 & 4A-4B are incremented by 200 and most require no further discussion herein. This embodiment differs from the previous embodiment in that this light transparent body 312 illustratively includes first and second longitudinal arms 316*a*-316*b* that are L-shaped. Here, the light source receiving slot 317 is rectangle-shaped.

Referring now additionally to FIG. 5C, another embodiment of the first rib 406 is now described. In this embodiment of the first rib 406, those elements already discussed above with respect to FIGS. 1-3 & 4A-4B are incremented by 300 and most require no further discussion herein. This embodiment differs from the previous embodiment in that this light transparent body 412 omits the first and second grooves. Rather, here, the body 411 illustratively comprises first and second arms 415*a*-415*b*, which define a longitudinal slot 424 therebetween, which receives the light transparent body 412.

Referring now additionally to FIG. 5D, another embodiment of the first rib 506 is now described. In this embodiment of the first rib 506, those elements already discussed above with respect to FIGS. 1-3 & 4A-4B are incremented by 400 and most require no further discussion herein. This embodiment differs from the previous embodiment in that this light transparent body 512 omits the first and second grooves. Rather, here, the body 511 illustratively comprises first and second arms 515*a*-515*b*, which define a longitudinal slot 524 therebetween, which receives the light transparent body 512. This light transparent body 512 illustratively includes first and second longitudinal arms 516*a*-516*b* that are straight and canted with respect to an axis 5-5. Here, the light source receiving slot 517 is trapezoid-shaped.

Figure 7A:
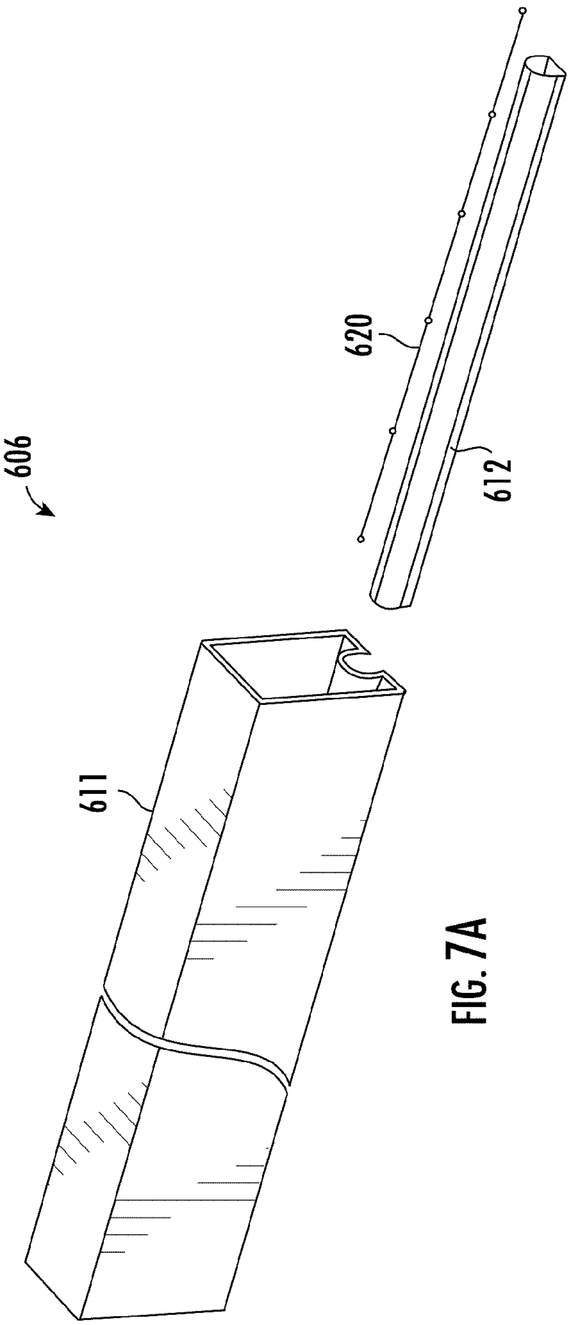
FIG. 7A is an exploded view of the first rib of FIG. 6A.

Referring now additionally to FIGS. 6A & 7A, another embodiment of the first rib 606 is now described. In this embodiment of the first rib 606, those elements already discussed above with respect to FIGS. 1-3 & 4A-4B are incremented by 500 and most require no further discussion herein. This embodiment differs from the previous embodiment in that this light transparent body 612 omits the first and second grooves. Rather, here, the light transparent body 612 illustratively comprises first and second longitudinal arms 616*a*-616*b* defining a light source receiving slot 617. Also, the body 611 illustratively comprises a longitudinal slot 625 receiving the light transparent body 612.

Referring now additionally to FIG. 6B, another embodiment of the first rib 706 is now described. In this embodiment of the first rib 706, those elements already discussed above with respect to FIGS. 1-3 & 4A-4B are incremented by 600 and most require no further discussion herein. This embodiment differs from the previous embodiment in that this light transparent body 712 omits the first and second grooves. Rather, here, the light transparent body 712 illustratively comprises first and second longitudinal arms 716*a*-716*b* defining a light source receiving slot 717, and first and second lateral arms 726*a*-726*b* extending outward from the first and second longitudinal arms and abutting the body 711.

Referring now additionally to FIG. 6C, another embodiment of the first rib 806 is now described. In this embodiment of the first rib 806, those elements already discussed above with respect to FIGS. 1-3 & 4A-4B are incremented by 700 and most require no further discussion herein. This embodiment differs from the previous embodiment in that this light transparent body 812 omits the first and second grooves. Rather, here, the light transparent body 812 illustratively comprises first and second longitudinal arms 816*a*-816*b* defining a light source receiving slot 817, and first and second lateral arms 826*a*-826*b* extending outward from the first and second longitudinal arms and abutting the body 811. This first rib 806 illustratively includes first and second longitudinal arms 816*a*-816*b* that are straight and substantially perpendicular with respect to an axis 6-6. Here, the light source receiving slot 817 is rectangle-shaped.

Referring now additionally to FIG. 6D, another embodiment of the first rib 906 is now described. In this embodiment of the first rib 906, those elements already discussed above with respect to FIGS. 1-3 & 4A-4B are incremented by 800 and most require no further discussion herein. This embodiment differs from the previous embodiment in that this light transparent body 912 illustratively includes first and second grooves 914*a*-914*b* that are elongate and vertically spaced apart from the light source receiving slot 917. The light transparent body 912 defines longitudinal channels flanking the light source receiving slot 917. Also, the body 910 comprises first and second curved arms 915*a*-915*b*.

Referring now additionally to FIG. 6E, another embodiment of the first rib 1006 is now described. In this embodiment of the first rib 1006, those elements already discussed above with respect to FIGS. 1-3 & 4A-4B are incremented by 900 and most require no further discussion herein. This embodiment differs from the previous embodiment in that this light transparent body 1012 illustratively includes first and second grooves 1014*a*-1014*b* that are elongated and vertically spaced apart from the light source receiving slot 1017. The light transparent body 1012 defines longitudinal channels flanking the light source receiving slot 1017. Also, the body 1010 comprises first and second curved arms 1015*a*-1015*b*. This first rib 1006 illustratively includes first and second longitudinal arms 1016*a*-1016*b* that are straight and canted with respect to an axis 6-6. Here, the light source receiving slot 1017 is trapezoid-shaped.

Figure 7B:
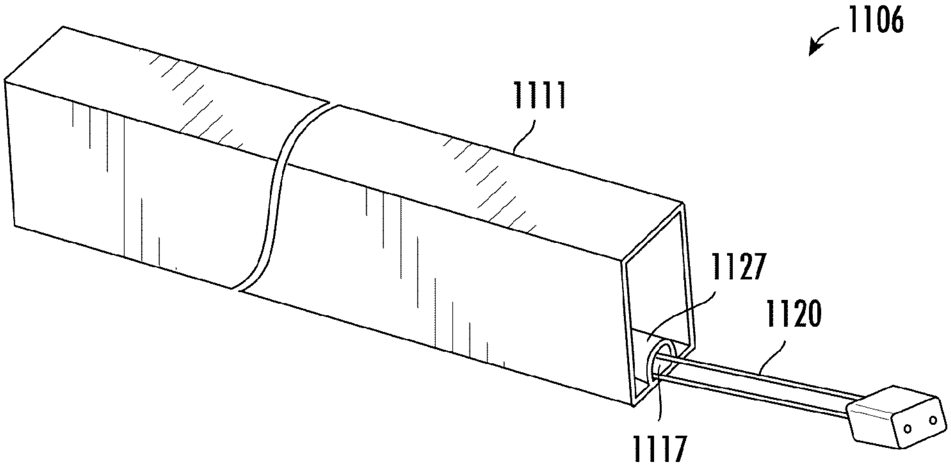
FIG. 7B is an exploded view of a different embodiment of the first rib from the umbrella of FIG. 1.

Referring now additionally to FIG. 7B, another embodiment of the first rib 1106 is now described. In this embodiment of the first rib 1106, those elements already discussed above with respect to FIGS. 1-3 & 4A-4B are incremented by 1000 and most require no further discussion herein. This embodiment differs from the previous embodiment in that this first rib 1106 illustratively includes the body 1111 integrated with the light transparent body 1112. In other words, the bottom facing panel of the body 1111 comprises a light transparent material, and the body comprises a tube 1127 defining the light source receiving slot 1117.

Referring now additionally to FIG. 8, another embodiment of the umbrella 1200 is now described. In this embodiment of the umbrella 1200, those elements already discussed above with respect to FIGS. 1-3 & 4A-4B are incremented by 1100 and most require no further discussion herein. This embodiment differs from the previous embodiment in that this umbrella 1200 has another cantilever/offset format with a second arm 1230.

Referring now additionally to FIG. 9, another embodiment of the umbrella 1300 is now described. In this embodiment of the umbrella 1300, those elements already discussed above with respect to FIGS. 1-3 & 4A-4B are incremented by 1200 and most require no further discussion herein. This embodiment differs from the previous embodiment in that this umbrella 1300 is a standard non-offset umbrella format.

Figure 10A:
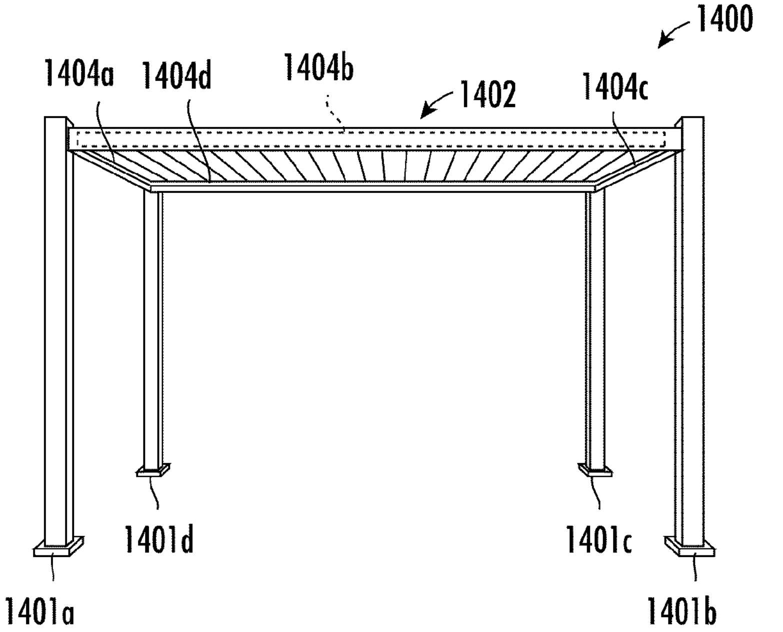
FIG. 10A is a perspective view of a pergola structure, according to the present disclosure.
Figure 10B:
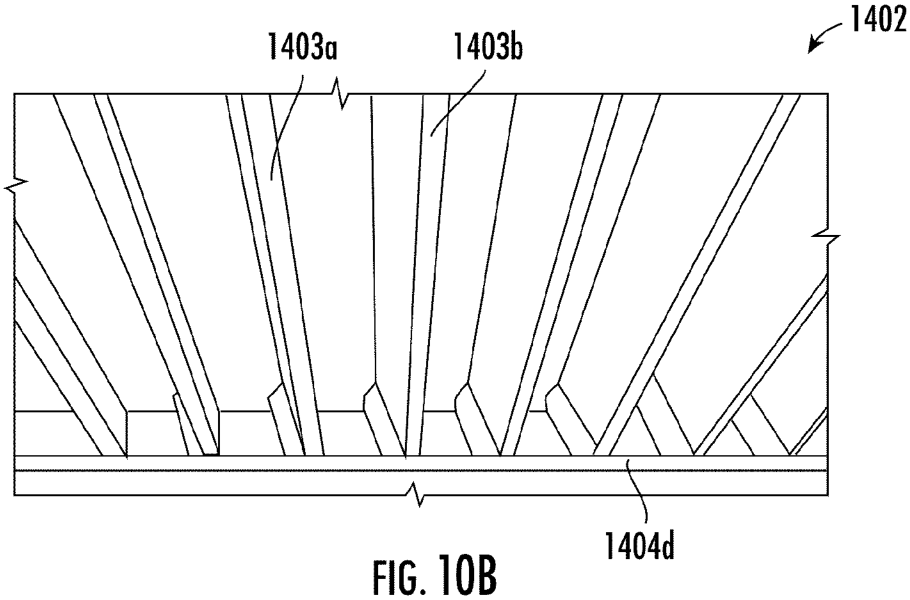
FIG. 10B is an enlarged perspective view of the pergola structure from FIG. 10A.

Referring now to FIGS. 10A-10B, a pergola structure 1400 according to the present invention is now disclosed. The pergola structure 1400 comprises a plurality of legs 1401*a*-1401*d*, and a roof assembly 1402 coupled to uppermost portions of the plurality of legs. As will be appreciated, the roof assembly 1402 illustratively comprises a plurality of rotating slats 1403*a*-1403*b* for providing shade under the pergola structure 1400, and a plurality of lighting strips 1404*a*-1404*d* at the periphery thereof. Each of the plurality of lighting strips 1404*a*-1404*d* may comprise a structure taken from any one of the first ribs 106, 206, 306, 406, 506, 606, 706, 806, 906, 1006, 1106 disclosed hereinabove in FIGS. 1-9. Broadly, each of the plurality of lighting strips 1404*a*-1404*d* may comprise a body, a light transparent body aligned with the body, the body and the light transparent body defining a coupling interface, and a light source carried by the coupling interface and configured to transit visible radiation through the light transparent body and under the roof assembly 1402. Further, other features of the above described umbrellas may be incorporated into the pergola structure 1400. For example, the PV cell and battery features may also be included to power the plurality of lighting strips 1404*a*-1404*d*.

It should be appreciated that the lighting features from the first ribs 106, 206, 306, 406, 506, 606, 706, 806, 906, 1006, 1106 disclosed hereinabove in FIGS. 1-9 and the plurality of lighting strips 1404*a*-1404*d* of FIGS. 10A-10B can be incorporated into other outdoor structures, for example, canopies, tents, aluminum screen enclosures, etc.

Other features relating to umbrellas are disclosed in co-pending applications: titled "UMBRELLA WITH PIVOTING LOCKING DEVICE AND RELATED METHODS," application Ser. No. 18/329,782; and titled "UMBRELLA WITH SLIDING MAST AND RELATED METHODS," application Ser. No. 18/186,375, all incorporated herein by reference in their entirety. These umbrella related features in the related applications may be combined with the features of the umbrellas disclosed herein. Further, features from the embodiments disclosed herein may be combined with each other.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An umbrella comprising:
- a support extending upwardly; and
- an umbrella canopy assembly coupled to the support and comprising
  - at least one tray,
  - a first plurality of ribs extending from the at least one tray, and
  - a canopy carried by the first plurality of ribs, each first rib comprising
    - a body comprising first and second body L-shaped arms,
    - a light transparent body aligned with the body and comprising
      - a medial portion being adjacent to the first and second body L-shaped arms,
      - first and second longitudinal arms extending upwardly from the medial portion and defining a slot, and
      - first and second light transparent L-shaped arms extending laterally from the medial portion and defining first and second grooves respectively receiving the first and second body L-shaped arms to define a tongue and groove coupling interface, the slot being between the first and second grooves, and
    - a light source carried within the slot and configured to transit visible radiation through the light transparent body and under the canopy,
    - the first and second body L-shaped arms, the first and second longitudinal arms, and the first and second light transparent L-shaped arms being coplanar with respect to a transverse axis of each first rib.

2. The umbrella of claim 1 wherein the slot is between the first and second body L-shaped arms and between the first and second light transparent L-shaped arms.

3. The umbrella of claim 1 wherein each of the first and second longitudinal arms comprises a curved arm.

4. The umbrella of claim 1 wherein each of the first and second longitudinal arms comprises a straight arm.

5. The umbrella of claim 1 wherein each of the first and second longitudinal arms comprises an L-shaped arm.

6. The umbrella of claim 1 wherein the light source comprises a strip of light emitting devices positioned within the slot.

7. The umbrella of claim 1 wherein each first rib comprises first and second end covers respectively positioned on first and second ends of a respective rib.

8. The umbrella of claim 1 wherein the umbrella canopy assembly comprises a photovoltaic cell, and a battery coupled to the photovoltaic cell and the light sources of the first plurality of ribs; and wherein the photovoltaic cell is carried by the at least one tray.

9. The umbrella of claim 1 wherein the at least one tray comprises a first tray coupled to the first plurality of ribs, a second tray below the first tray, and a second plurality of ribs coupled between the second tray and the first plurality of ribs.

10. An umbrella comprising:
- a support extending upwardly; and
- an umbrella canopy assembly coupled to the support and comprising
  - at least one tray,
  - a first plurality of ribs extending from the at least one tray,
  - a canopy carried by the first plurality of ribs, each first rib comprising
    - a body comprising first and second body L-shaped arms,
    - a light transparent body aligned with the body and comprising
      - a medial portion being adjacent to the first and second body L-shaped arms,
      - first and second longitudinal arms extending upwardly from the medial portion and defining a slot, and
      - first and second light transparent L-shaped arms extending laterally from the medial portion and defining first and second grooves respectively receiving the first and second body L-shaped arms to define a tongue and groove coupling interface, the slot being between the first and second grooves, and
    - a strip of light emitting devices carried within the slot and configured to transit visible radiation through the light transparent body and under the canopy, the first and second body L-shaped arms, the first and second longitudinal arms, and the first and second light transparent L-shaped arms being coplanar with respect to a transverse axis of each first rib,
  - a photovoltaic cell, and
  - a battery coupled to the photovoltaic cell and the strips of light emitting devices of the first plurality of ribs.

11. The umbrella of claim 10 wherein the slot is between the first and second body L-shaped arms and between the first and second light transparent L-shaped arms.

12. The umbrella of claim 10 wherein each of the first and second longitudinal arms comprises a curved arm.

13. The umbrella of claim 10 wherein each of the first and second longitudinal arms comprises a straight arm.

14. The umbrella of claim 10 wherein each of the first and second longitudinal arms comprises an L-shaped arm.

15. The umbrella of claim 10 wherein each first rib comprises first and second end covers respectively positioned on first and second ends of a respective rib.

16. The umbrella of claim 10 wherein the photovoltaic cell is carried by the at least one tray.

17. The umbrella of claim 10 wherein the at least one tray comprises a first tray coupled to the first plurality of ribs, a second tray below the first tray, and a second plurality of ribs coupled between the second tray and the first plurality of ribs.

18. A method of making an umbrella, the method comprising:

forming a support to extend upwardly; and coupling an umbrella canopy assembly to the support, the umbrella canopy assembly comprising at least one tray, a first plurality of ribs extending from the at least one tray, and a canopy carried by the first plurality of ribs, each first rib comprising a body comprising first and second body L-shaped arms, a light transparent body aligned with the body and comprising a medial portion being adjacent to the first and second body L-shaped arms, first and second longitudinal arms extending upwardly from the medial portion and defining a slot, and first and second light transparent L-shaped arms extending laterally from the medial portion and defining first and second grooves respectively receiving the first and second body L-shaped arms to define a tongue and groove coupling interface, the slot being between the first and second grooves, and a light source carried within the slot and configured to transit visible radiation through the light transparent body and under the canopy, the first and second body L-shaped arms, the first and second longitudinal arms, and the first and second light transparent L-shaped arms being coplanar with respect to a transverse axis of each first rib.

19. The method of claim 18 wherein the slot is between the first and second body L-shaped arms and between the first and second light transparent L-shaped arms.

20. The method of claim 18 wherein each of the first and second longitudinal arms comprises one of a curved arm, a straight arm, and an L-shaped arm.

* * * * *